United States Patent [19]

Gaines et al.

[11] 4,003,666
[45] Jan. 18, 1977

[54] BALL JOINT ASSEMBLY

[75] Inventors: Donald R. Gaines, Farmington Hills; Jon M. Smallegan, Ann Arbor; William H. Trudeau, Brighton, all of Mich.

[73] Assignee: Gulf & Western Manufacturing Company, Southfield, Mich.

[22] Filed: May 21, 1976

[21] Appl. No.: 688,846

[52] U.S. Cl. .................................. 403/36; 403/134; 403/140; 277/212 FB
[51] Int. Cl.² .................................. F16C 11/06
[58] Field of Search ........ 403/135, 132, 136, 138, 403/140, 134, 36, 35, 133, 122; 277/212 FB; 74/18.1

[56] References Cited
UNITED STATES PATENTS

| | | | |
|---|---|---|---|
| 2,708,590 | 5/1955 | Latzen | 403/138 |
| 3,208,290 | 9/1965 | Mathues | 403/36 X |
| 3,362,735 | 1/1968 | Maxeiner | 403/132 |
| 3,451,701 | 6/1969 | Smith | 403/140 |

FOREIGN PATENTS OR APPLICATIONS 878,147   9/1961   United Kingdom ............ 403/135

Primary Examiner—Andrew V. Kundrat
Attorney, Agent, or Firm—Barnes, Kisselle, Raisch & Choate

[57] ABSTRACT

A ball joint assembly having a ball stud member received in a socket member. The ball of the stud member is retained in a recess in the socket member by a main bearing ring, a pair of wear rings, and a pair of load rings. A lubricating grease is supplied to the interface of the ball of the stud member with the bearing and wear rings by a plurality of circumferentially spaced grooves extending generally axially across the bearing and wear rings. The grooves in the wear rings communicate with lubricant reservoirs defined by the housing member in cooperation with a cover and a flexible seal member adjacent opposed polar regions of the ball of the stud member.

10 Claims, 6 Drawing Figures

U.S. Patent   Jan. 18, 1977   4,003,666
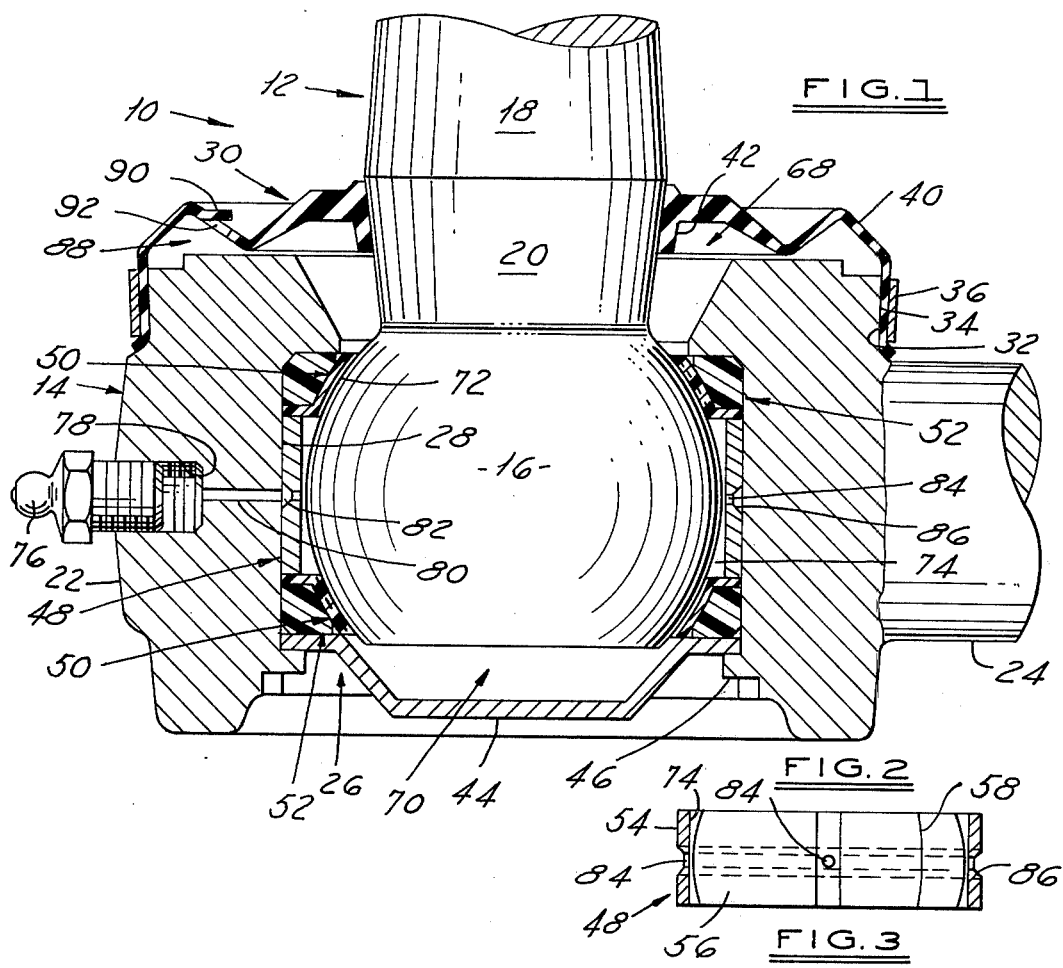
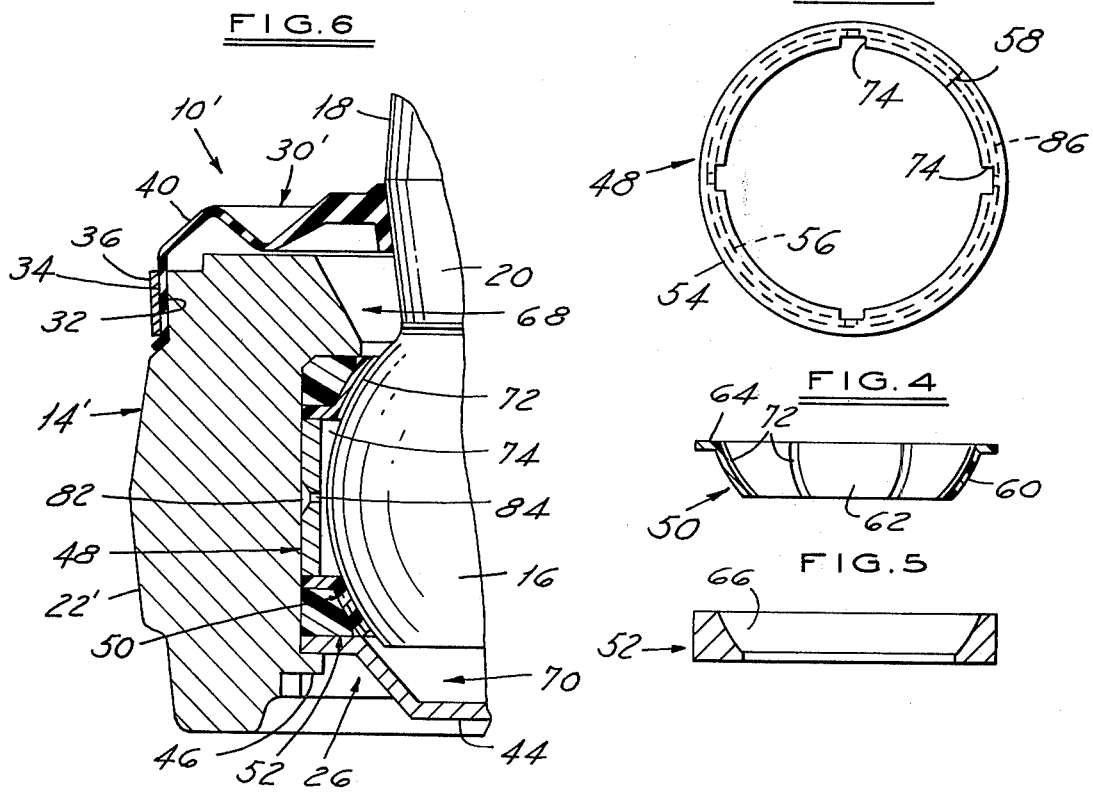

BALL JOINT ASSEMBLY

This invention relates to a ball joint assembly and more particularly to a ball joint assembly commonly used in off-the-road motor vehicle steering system linkages.

U.S. Pat. No. 3,451,701 issued on June 24, 1969 discloses a previously known permanently lubricated ball joint assembly which is particularly useful in automotive and light truck steering system linkages. The ball stud member of this assembly is retained by a plastic bearing ring received in a recess in the socket member of the assembly. In this assembly permanent lubrication, compensation for wear between the ball and the plastic bearing ring, and a preload torque on the ball joint are provided by a pair of rings of a fiberous material impregnated with a fatty acid lubricating compound which are compressed between the socket member, the ball, and the plastic bearing ring.

The ball joint assemblies used in off-the-road motor vehicles such as heavy duty trucks, earth movers, tractors, etc. should be of rugged and durable construction and capable of functioning properly in dusty, dirty, and moist environments and often with mud or other particulate contaminants such as coal and cement particles encrusted on the joint assemblies. Usually grease fittings are provided on such ball joint assemblies so that they can be lubricated from time to time while in service to renew the grease and purge contaminants from the interior of such ball joint assemblies. However, in some applications it is preferable to provide a permanent supply of grease for such ball joint assemblies so that they can be used for the life time of the joint assembly without further lubrication thereof.

Objects of this invention are to provide a ball joint assembly suitable for off-the-road vehicles which is rugged, durable, readily and economically produced in both lubricatable and permanently lubricated forms, has a long service life, and is of economical manufacture and assembly.

These and other objects, features and advantages of this invention will be apparent from the following disclosure, appended claims, an accompanying drawing in which:

FIG. 1 is a fragmentary side view in section of a lubricatable ball joint assembly embodying this invention.

FIGS. 2 and 3 are a sectional and a plan view respectively of the bearing ring of the assembly of FIG. 1.

FIG. 4 is a sectional view of a wear ring of the assembly of FIG. 1.

FIG. 5 is a sectional view of a load ring of the assembly of FIG. 1.

FIG. 6 is a fragmentary sectional view of a permanently lubricated ball joint assembly embodying this invention.

Referring in more detail to the drawings, FIG. 1 illustrates a ball joint assembly 10 embodying this invention with a ball stud member 12 received in a socket member 14. Ball stud 12 has a ball 16 connected to a tapered shank 18 by an intermediate neck 20 with a reverse taper. Socket 14 has a one-piece preferably forged body 22 with an integral connecting arm 24 and an opening 26 therethrough with a cylindrical recess 28 therein.

A seal 30 cooperates with ball stud member 12 and socket member 14 to prevent moisture and contaminants from entering the upper end of joint assembly 10. Seal 30 is a generally cup-shaped member with a circumferentially continuous lip 32 retained in sealing engagement with a cylindrical surface 34 of body 22 by a clamp band 36. Seal 30 has an undulating wall 40 with a central depending collar 42 urged into sealing engagement with the tapered neck 20 of ball stud 12 by the resiliency of the seal 30. Seal 30 is made of a material such as polyurethane which is flexible, resilient, oil and weather resistant, and has a low coefficient of friction, high resistance to abrasion, and good flexure strength. Similarly, a cover 44 retained in recess 28 by stakes 46 prevents moisture and contaminants from entering the lower end of joint assembly 10.

In accordance with one feature of this invention ball 16 is mounted in socket 14 by a bearing and wear compensating assembly having a main bearing ring 48, wear rings 50, and load rings 52, all slideably received in recess 28. As shown in FIGS. 2 and 3, bearing ring 48 has a generally cylindrical outer surface 54 and a spherical inner surface 56 mating with and complementary to the equatorial area of the spherical surface of ball 16. To facilitate insertion of ball 16 into bearing ring 48 it is split at 58. Bearing ring 48 is made of materials having suitable bearing characteristics such as bronze, brass, sintered powdered iron, and high density plastics.

As shown in FIG. 4, each wear ring 50 has an annular wall 60 with a spherical inner surface 62 mating with and complementary to an area of the spherical surface of ball 16 between the equatorial area and one of the polar regions of the ball. Each wear ring 50 also has a peripheral flange 64 adapted to bear on one of the opposed ends of bearing ring 58. Wear rings 50 are made of materials such as nylon and acetal plastics which are oil resistant, flexible, and have a low coefficient of friction, high density, and high resistance to abrasion.

As shown in FIG. 5, each load ring 52 has an inner spherical surface 66 complementary to the outer surface of wall 60 of wear ring 50. Load rings 52 are dimensioned with respect to wear rings 50, recess 28 and cover 44 such that in assembly the load rings 52 are compressed to urge the walls 60 of wear rings 50 into firm engagement with ball 16 throughout the service life of joint assembly 10. This arrangement both controls the preload torque on the ball 16 of the joint assembly 10 and provides compensation for in-service wear between the ball 16 and rings 48 and 50 so that even though such wear occurs, there is little, if any, play or lost motion between the ball stud 12 and the socket 14 of the joint assembly 10. Preferably, load rings 52 are made of a polyurethane material such as 12073 polyurethane sold by Ohio Rubber Company, Orthane Division, P.O. Box 1398, Denton, Texas 76201 which is highly oil resistant and resilient and has a high spring rate and a good elastic memory.

In accordance with another feature of this invention grease received in reservoirs 68 and 70 defined in part by seal 30 and cover 44 is supplied to the interface of ball 16 with wear rings 50 by a plurality of circumferentially spaced grooves 72 extending generally axially across the annular wall 60 of each wear ring 50 and opening into the inner surface 62 thereof. Similarly, grease is also supplied to the interface of ball 16 with bearing ring 48 by a plurality of circumferentially spaced grooves 74 extending generally axially across the bearing ring and opening into the inner surface 56 thereof.

In use, grease is supplied to the interior of joint assembly 10 through a grease fitting 76, such as the well-known Alemite fitting, received in a threaded passage 78 in body 22 of socket member 14. Passage 78 communicates with grooves 74 in bearing ring 48, grooves 72 in wear rings 50, and thence reservoirs 68 and 70 via a passage 80 in body 22, a circumferentially continuous passage 82 in bearing ring 48, and ports 84 in bearing ring 48 interconnecting passage 82 with grooves 74. Passage 82 is defined by the cooperation of recess 28 with a circumferentially continuous groove 86 in the outer cylindrical surface 54 of bearing ring 48.

To permit used grease and any contaminants carried thereby to be purged or flushed from joint assembly 10 when new grease is injected through grease fitting 80, one or more valves 88 are provided in seal 30. Each valve 88 has a flap 90 integral with seal 30 which is shown in the open position to which it is moved by the passage of lubricant through an opening 92 in the wall of seal 30. The flap 90 is normally received in opening 92 when grease is not being discharged from the opening. The flap 90 and opening 92 of valve 88 can be readily produced in the wall of seal 30 by cutting a generally U-shaped slit therethrough. When ball joint assembly 10 is used in service, it is normally lubricated either periodically or as required by injecting grease into the joint assembly through grease fitting 76.

Ball joint assembly 10 can be readily modified to provide a ball joint assembly 10' as shown in FIG. 6 which when produced is permanently filled with grease so that is can be used for the life of the joint assembly without further greasing. Joint assembly 10' is the same as joint assembly 10 except that assembly 10' has a modified body 22' of socket 14' from which grease fitting 76 and associated passages 78 and 80 have been eliminated and a modified seal 30' from which all of vents 88 have been eliminated. If desired, ports 84 and groove 86 may also be eliminated from bearing ring 48. During assembly of ball joint 10' a quantity of grease is placed in reservoirs 68 and 70 to provide permanent lubrication of the joint assembly throughout the service life thereof.

We claim:

1. In a joint assembly with a socket member having an opening therethrough with a substantially cylindrical recess therein, a stud member with a ball received in said recess and a stud projecting therefrom through said opening to the exterior of said socket member, and a seal member of a flexible resilient material engaging both the stud and the socket member and at least in part defining a lubricant reservoir adjacent the ball, the improvement comprising a ring of a bearing material received in said recess of said socket member and encircling an equatorial area of said ball, a pair of separate wear rings of a high density plastic material with a low coefficient of friction received in said recess of said socket member adjacent opposed ends of said bearing ring and each surrounding an area of said ball between the equatorial area and one of the polar regions of said ball, load rings of a resilient material each interposed and compressed between one of said wear rings and said recess of said socket member and each urging one of said wear rings into engagement with said ball such that the joint assembly has wear take-up compensation, and both said bearing ring and at least said wear ring adjacent said sealing member each having at least two circumferentially spaced grooves extending generally axially thereacross and opening onto said ball to provide lubricating passages communicating with said ball and with said lubricant reservoir defined at least in part by said seal member.

2. The combination of claim 1 wherein said seal member is impervious to a lubricant and said reservoir defined at least in part by said seal member is permanently filled with a grease during manufacture of said joint assembly to provide a joint assembly lubricated for the life of the joint assembly.

3. The joint assembly of claim 1 wherein said bearing ring has a circumferentially extending groove opening outwardly thereof and defining in cooperation with said recess in said socket member a lubricant feeder passage, said bearing ring having passages therein communicating said lubricant feeder passage with said grooves extending generally axially across said bearing ring to provide lubricating passages communicating with said ball, and a grease fitting carried by said socket member and communicating with said lubricant feeder passage defined in part by said circumferentially extending groove in said bearing ring, said grease fitting being accessible from the exterior of said joint assembly, whereby said joint assembly may be lubricated in service by injecting grease into said joint assembly through said grease fitting.

4. The joint assembly of claim 1 which also comprises a grease fitting communicating with said lubricant reservoir defined at least in part by said seal member, said grease fitting being accessible from the exterior of said ball joint assembly.

5. The joint assembly of claim 4 wherein said seal member has at least one valve therein permitting egress of lubricant from said reservoir defined at least in part by said seal member when an excess quantity of lubricant is introduced into said joint assembly through said grease fitting.

6. The joint assembly of claim 1 which also comprises a cover received in said recess of said socket member adjacent the polar region of said ball generally opposite said stud and at least in part defining a second lubricant reservoir and wherein the retainer ring adjacent said last mentioned polar region of said ball has circumferentially spaced grooves extending generally axially thereacross and opening onto said ball to provide lubricating passages communicating with said ball and with said second lubricant reservoir defined at least in part by said cover.

7. The joint assembly of claim 6 wherein both said seal member and said cover are impervious to a lubricant and a grease is placed in both of said reservoirs during manufacture of said joint and permanently retained therein by said seal member and said cover in cooperation with said socket member to provide a joint assembly lubricated for the life of the joint assembly.

8. The joint assembly of claim 6 which also comprises a grease fitting communicating with said lubricant reservoir defined at least in part by said seal member, said grease fitting being accessible from the exterior of said ball joint assembly.

9. The joint assembly of claim 6 wherein said bearing ring has a circumferentially extending groove opening outwardly thereof and defining in cooperation with said recess in said socket member a lubricant feeder passage, said bearing ring having passages therein communicating said lubricant feeder passage with said grooves extending generally axially across said metallic bearing ring to provide lubricating passages communicating with said ball, and a grease fitting carried by said socket member and communicating with said lubricant feeder passage defined in part by said circumferentially extending groove in said bearing ring, said grease fitting being accessible from the exterior of said joint assembly, whereby said joint assembly may be lubricated in service by injecting grease into said joint assembly through said grease fitting.

10. The joint assembly of claim 9 wherein said seal member has at least one valve therein permitting egress of lubricant from said reservoir defined at least in part by said seal member when an excess quantity of lubricant is introduced into said joint assembly through said grease fitting.

* * * * *